(12) United States Patent
West

(10) Patent No.: US 9,496,909 B2
(45) Date of Patent: Nov. 15, 2016

(54) CELL PHONE HOLDING DEVICE

(71) Applicant: Charles Paul West, Fort Myers, FL (US)

(72) Inventor: Charles Paul West, Fort Myers, FL (US)

(*) Notice: Subject to any disclaimer, the term of this patent is extended or adjusted under 35 U.S.C. 154(b) by 0 days.

(21) Appl. No.: 14/809,600

(22) Filed: Jul. 27, 2015

(65) Prior Publication Data

US 2016/0233909 A1 Aug. 11, 2016

Related U.S. Application Data

(60) Provisional application No. 62/042,937, filed on Aug. 28, 2014.

(51) Int. Cl.
*H04B 1/3827* (2015.01)
*H04M 1/04* (2006.01)

(52) U.S. Cl.
CPC ............... *H04B 1/385* (2013.01); *H04M 1/04* (2013.01); *H04B 2001/3861* (2013.01)

(58) Field of Classification Search
CPC H04B 2001/3861; H04B 1/385; H04M 1/04
See application file for complete search history.

(56) References Cited

U.S. PATENT DOCUMENTS

| 5,823,980 A * | 10/1998 | Kopfer ............... A61F 5/0104 473/213 |
| 6,550,108 B2 | 4/2003 | Pratl |
| 7,469,809 B2 | 12/2008 | Rodarte et al. |
| 8,374,657 B2 * | 2/2013 | Interdonato ............ H04B 1/385 379/433.07 |
| D687,039 S | 7/2013 | Wyers |
| 2003/0040285 A1 * | 2/2003 | Whitley ..................... A45F 5/00 455/575.1 |
| 2005/0205623 A1 * | 9/2005 | Buntain ..................... A45F 5/00 224/217 |
| 2006/0279098 A1 * | 12/2006 | Shipley ..................... A45F 5/00 294/25 |
| 2007/0181620 A1 | 8/2007 | Carver |
| 2012/0031937 A1 * | 2/2012 | Baker ..................... A45C 11/00 224/217 |
| 2012/0261930 A1 * | 10/2012 | Bethea ..................... A45F 5/00 294/25 |
| 2012/0267402 A1 | 10/2012 | Beatty |
| 2014/0084035 A1 * | 3/2014 | Georges ..................... A45F 5/00 224/267 |
| 2014/0213330 A1 | 7/2014 | Oh |
| 2014/0252786 A1 * | 9/2014 | Singhal ................. G06F 1/1626 294/137 |
| 2015/0001290 A1 * | 1/2015 | Tovar ..................... G06Q 20/34 235/380 |
| 2016/0007723 A1 * | 1/2016 | Georges ..................... A45F 5/00 224/580 |

FOREIGN PATENT DOCUMENTS

JP 2004-16353 1/2004

* cited by examiner

*Primary Examiner* — Lewis West
(74) *Attorney, Agent, or Firm* — Frank Marino

(57) ABSTRACT

A band engages a handheld electronic device for facilitating the holding and operation thereof, the device being of the type having a front touch screen side and a rear side. The band has a transparent portion for overlying the front touch screen, allowing viewing and activation of the front touch screen there-through. The band also has a grasping portion for overlying the rear side, forming a pocket for receiving one or more holding fingers.

2 Claims, 5 Drawing Sheets

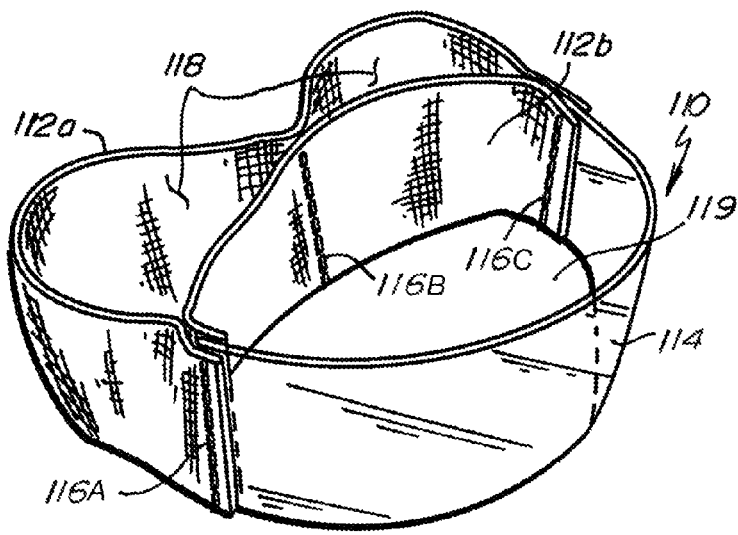
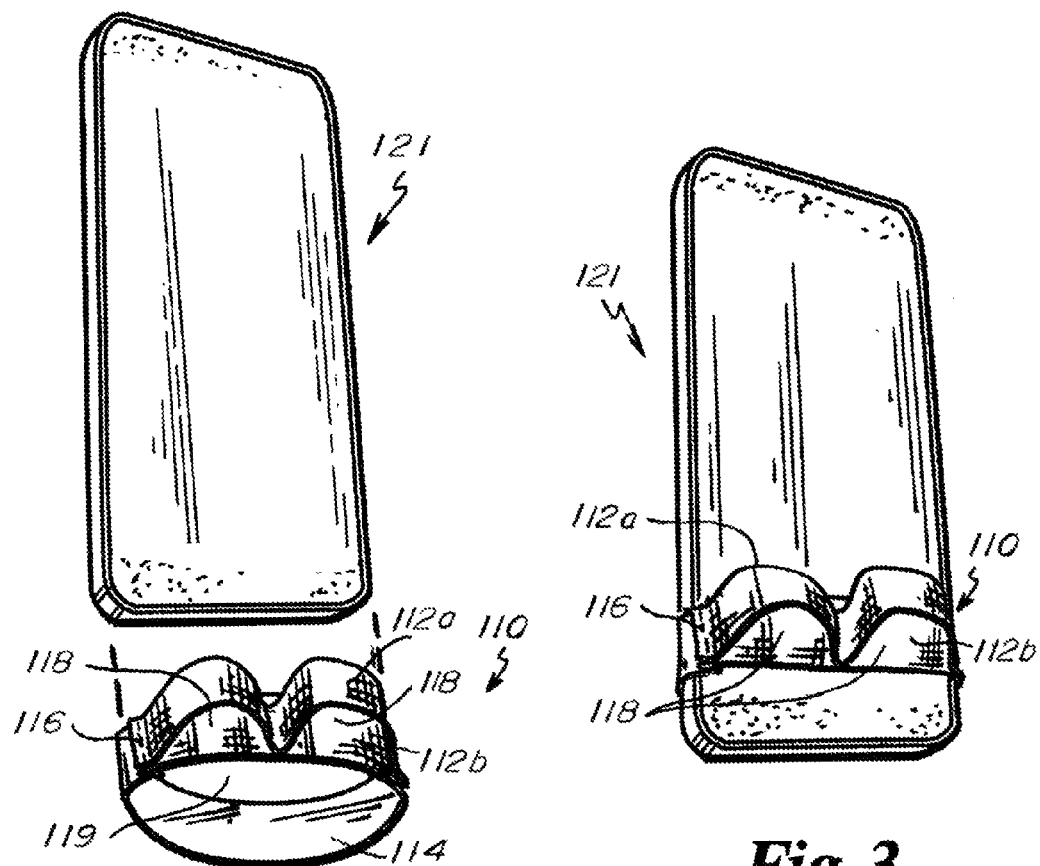
Fig.1
Fig.2
Fig.3

CELL PHONE HOLDING DEVICE

RELATED APPLICATIONS

This application claims the benefit of U.S. Provisional Application No. 62/042,937 filed on 28 Aug. 2014.

FIELD OF THE INVENTION

This invention is related to cell phones and similar handheld electronic apparatuses such as Ipods®, mp3 players, video players, and such. More specifically, the invention is related to a device for comfortably, securely, and effectively holding such apparatuses. Even more specifically, the invention is related to a device for affixing to a cell phone to enable one-hand holding and operation of the phone.

BACKGROUND OF THE INVENTION

There is an ever-increasing need to improve control of cell phones and smart phones, driven by the introduction of touch screens to and the increases in functionality of such devices. Users now more than ever are realizing the need to operate these devices with one hand. The hand that holds the device is oftentimes the same hand that operates its touch screen or keys.

USP D687039 demonstrates a Finger Control Band for a Phone Case. The case would presumably fit over the device and the case itself is equipped with a band that would presumably wrap over the user's fingers to enable the user to operate the front of the device with his/her thumb. But among other drawbacks, the case would be dedicated to a particular device model and therefore a different one of these cases would need to be made for every potential device model.

Publication US 2014/0364176 likewise demonstrates a Phone Case with Movable Strap and Cover which provides a similar function, but is again dedicated to a particular phone model and not able to be moved from one phone to the next.

Publication US 2012/0267402 demonstrates a Grip and Hands-Free Support for Multimedia Devices that includes a gripping element that is attached to the backside of a device or to the case for the device using peel & stick mounting tape. Among other drawbacks, such a gripping element is permanently affixed to the first device and not easily reusable on other devices.

SUMMARY OF THE INVENTION

The invention may by embodied in or practiced using a device to hold a cell phone in an ergonomic position, preventing dropping of the cell phone when using it for calling, texting, viewing it, and shooting photos with it (including "selfies").

The device provides a quick, simple, and efficient way to engage a cell phone with the hand and keep it there during such activities and making calls, shooting photos, surfing the web, shooting "selfies", and texting. A particular benefit of this design is that it does not attach to the phone with glue, adhesives, snaps, or hook and loop fastening.

The device slips on and off the phone, when needed, and prevents dropping the phone. In one embodiment, the device is a simply stitched unit of elastic strapping and clear, flexible plastic. In other embodiments the device is integrally formed in one homogenous piece. Because of the materials used and their arrangement, the device can be used with or adapted to virtually any cell phone, and most cell phone cases.

The invention may be practiced by or using a band for engaging a handheld electronic device for facilitating the holding and operation thereof, the device being of the type having a front touch screen side and a rear side. The band may include a transparent portion for overlying the front touch screen . . . the transparent portion allowing viewing and activation of the front touch screen there-through. The band may also include a grasping portion for overlying the rear side . . . the grasping portion forming a pocket for receiving one or more holding fingers.

The transparent portion may be a thin plastic film. The thin plastic film may be vinyl. The vinyl may be from 0.010 to 0.025 inches thick. The transparent portion may be a window within a peripheral frame.

The grasping portion may be elastic to allow the band to engage a variety of different sized handheld electronic devices. The grasping portion may have one or more finger receivers. The grasping portion may include a clip slidable along the grasping portion for forming and for varying the size of the pocket.

The invention may also be practiced by or using a band for engaging such a handheld electronic device having such a transparent portion and such a grasping portion and a clip, wherein the clip may engage the grasping portion in one of a variety of selectable locations to cause the pocket into two smaller pockets of variable size according to the selected location, each for receiving a variable number of holding fingers.

The invention may also be practiced by or using a band for engaging such a handheld electronic device having such a transparent portion and such a grasping portion, the grasping portion forming at least two pockets each for receiving one or more holding fingers, and an adjustment fitting. The grasping portion may cooperate with the adjustment fitting to selectably vary the size of at least two of the at least two pockets.

BRIEF DESCRIPTION OF THE DRAWINGS

FIG. 1 is a perspective view of a cell phone holding device according to a first exemplary embodiment;

FIG. 2 is a rear view of the device of FIG. 1 being fitted to a cell phone;

FIG. 3 is a rear view the device of FIG. 1 fitted to the cell phone of FIG. 2;

DETAILED DESCRIPTION OF THE EXEMPLARY EMBODIMENTS

FIGS. 1 to 5 show a first exemplary device 110 according to the invention. The device is preferably constructed to include at least three components; lens 114, elastic back strap 112b, and finger loop strap 112a.

The lens is preferably approximately ¾×4 inches. It is preferably made of 20 gauge clear vinyl, but may be made of any equivalent material that a) is sufficiently flexible to fit over and engage the cell phone's screen, b) is transparent enough to allow viewing of the screen there-through, and c) does not interfere with the means by which the screen senses touch. Lens could also be an opaque strap having a window there-through, with a strap forming a thin peripheral frame around the window.

The elastic back strap is preferably approximately ¾×2⅛ inches. It is preferably made of elastic fabric strapping, but may be made of any equivalent material that is sufficiently flexible and elastic to fit snuggly over and around the cell phone's body. It may be the same material as the lens.

The finger loop strap is preferably approximately ¾×3⅛ inches. It is preferably made of elastic fabric strapping, but may be made of any equivalent material that is sufficiently flexible and elastic to fit snuggly over the user's fingers. It may be the same material and color as, or a different material and color from, the back strap.

The dimensions above are intended for use with a typical Apple® Iphone 4®, but are merely exemplary and may vary according to different phone sizes.

Figures 4, 5:
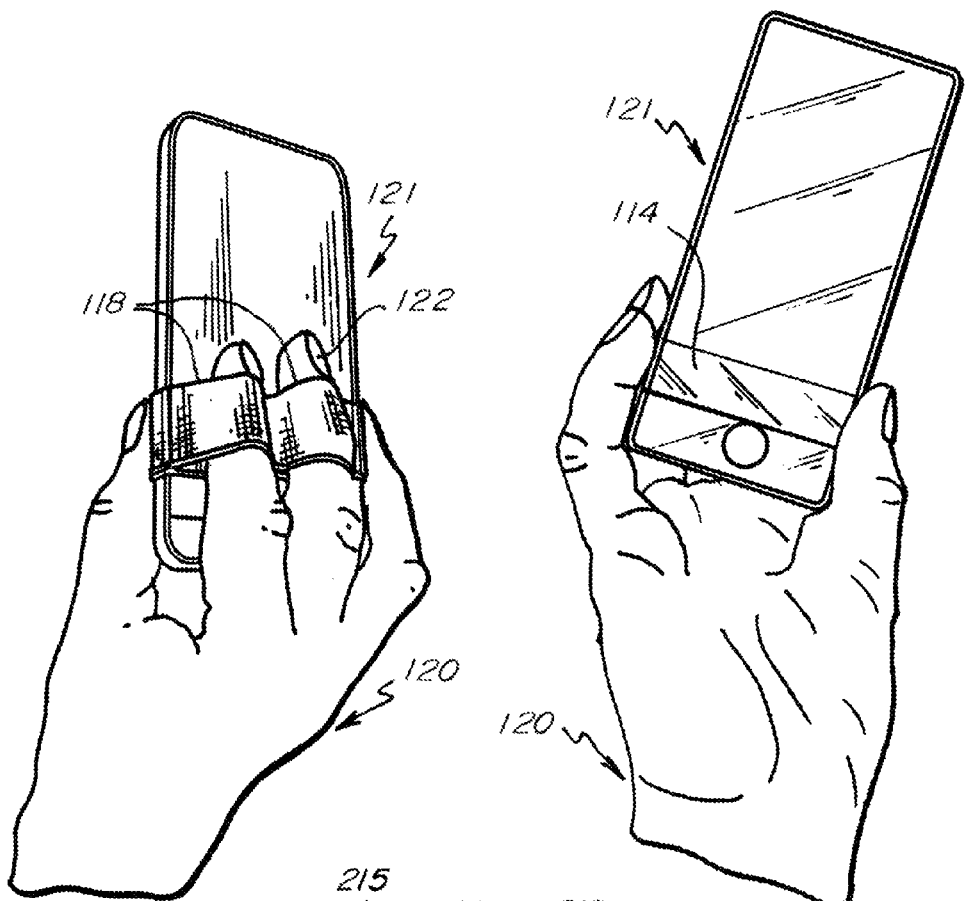
FIG. 4 is a rear view of the device of FIG. 1 and cell phone of FIG. 2 in use.
FIG. 5 is a front view of the device of FIG. 1 and cell phone of FIG. 2 in use.

Elastic back strap 112b and finger loop strap 112a are preferably held together at their centers by stitch 116B. If the materials used were capable, the stitching could be replaced by gluing, welding, or any similar form of joining This single center stitch is used when creating the disclosed two finger apertures 118 for two finger use such as shown in FIG. 4. Alternatively, two separated and parallel stitches straddling the center of the device could be used to create three finger apertures, three stitches could create four finger apertures, or no stitches could create one aperture to accommodate all fingers in "mitten" fashion.

The ends of the elastic back strap and the finger loop strap are placed together and aligned, and the ends of lens 114 are placed between or against them and all three layers are then affixed together by outer stitches 116A and 116C. Again, this stitching could be replaced by gluing, welding, or any similar form of joining Due to the longer length of the finger loop strap compared to the back strap, finger apertures 118 are created when these outer stitches are made. These finger apertures are sized to accommodate typical fingers, but the length of the finger loop strap can be varied to accommodate various finger sizes (such as to provide small/medium/large or male/female models). Phone aperture 119 is also created, to slip over a cell phone 121. The dimensions stated above are intended to accommodate a typical Apple® Iphone 4®, but the length of the three components can be varied in production to accommodate various phones of different sizes.

FIG. 2, taken from the back side of cell phone 121, shows the orientation of the cell phone when device 110 is about to be installed, by placing phone aperture 119 over the phone. The device is then slid over the cell phone 121 as shown in FIG. 2 to the desired position shown in FIG. 3, which shows device 110 in place and ready to use.

FIG. 4 shows the insertion of the fingers 122 into finger apertures 118. This leaves the thumb and remaining fingers free to select functions on the cell phone, such as to write texts or to access the camera shutter button. FIG. 4 also shows the index and middle fingers inserted into the finger apertures, but users may alternatively choose to insert the middle and ring fingers, leaving the more dexterous index finger for using the phone or using the index and little fingers free to rest on the sides of the cell phone for added stability, such as while shooting photos. One may also insert the index and ring finger which leaves the middle finger resting between the two fingers inserted into the finger apertures for added stability. The ring finger can be slightly bent at this point to increase the holding strength.

FIG. 5 shows the device in use from the front "control" side of the cell phone, with clear lens 114 in place. The lens spans the front screen and is clear and strong. When the cell phone is in use, it retains all of the touch sensitive attributes of the screen so that all the phone functions continue to be within reach of the user, say by using his thumb or his other fingers. All cell phone functions are maintained, so using the phone for photos, computing, movies, audio, web surfing, email or texting will continue to work without taking the device off the phone or off the hand.

Figure 6:
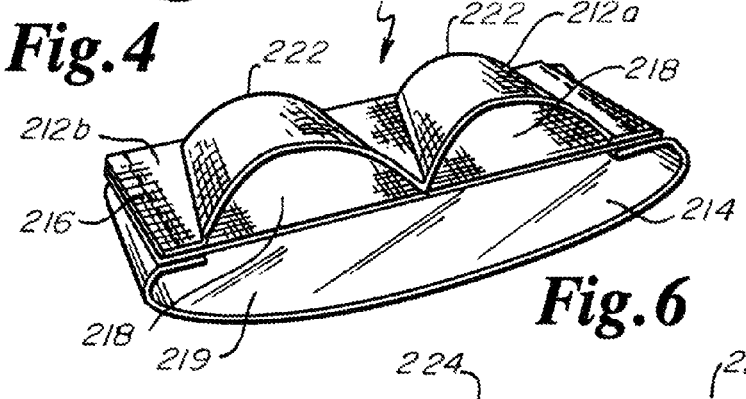
FIG. 6 is a perspective view of a cell phone holding device according to a second exemplary embodiment.
Figure 7:
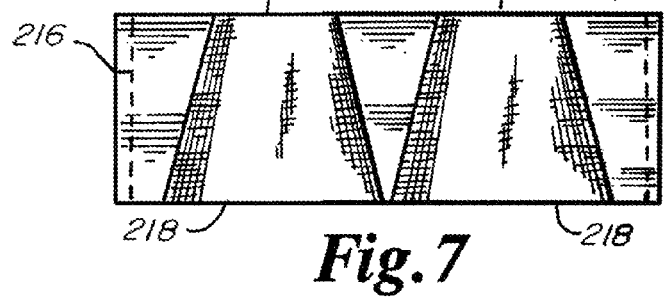
FIG. 7 is a rear view of the device of FIG. 6.

FIGS. 6 and 7 show an alternative device 215 in which the finger apertures use four stitches and are tapered from wide insertion ends 218 to thinner exit ends 222 to fit a variety of finger sizes.

Figure 8:
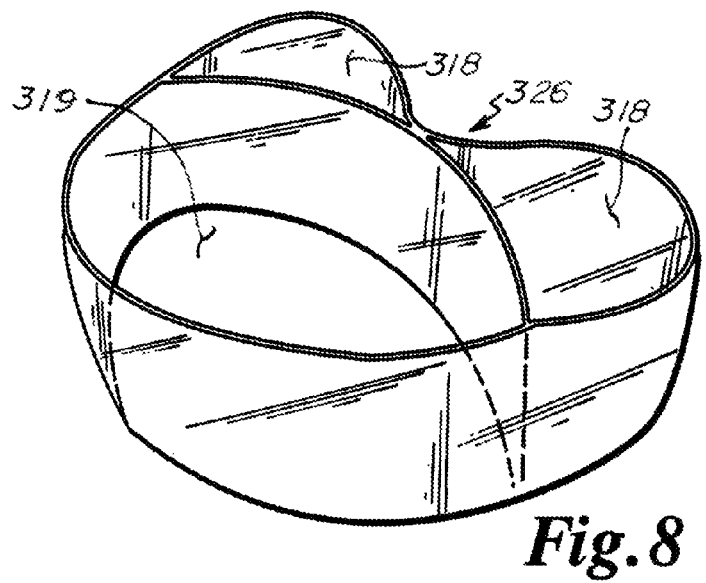
FIG. 8 is a perspective view of a cell phone holding device according to a third exemplary embodiment.

FIG. 8 shows another alternative device 326 made from an extrusion molded process. It is extruded as one long and continuous piece and then sliced into the shown slices which are approximately ¾" wide. This embodiment is preferably homogenously made of transparent flexible material such as vinyl, which may be varied in size and durometer to fit to various phone and finger sizes.

Alternatively, this embodiment may be co-extruded such that the specifications of any of the three main components may be different than the others. For instance, the lens portion may be a transparent vinyl of a higher durometer, the back strap portion may be an opaque vinyl of a slightly lower durometer so that it stretches when fitted over the phone, and the finger loop portion may be a vinyl of an even lower durometer for optimal finger comfort and adaptability to various finger sizes.

Figure 9:
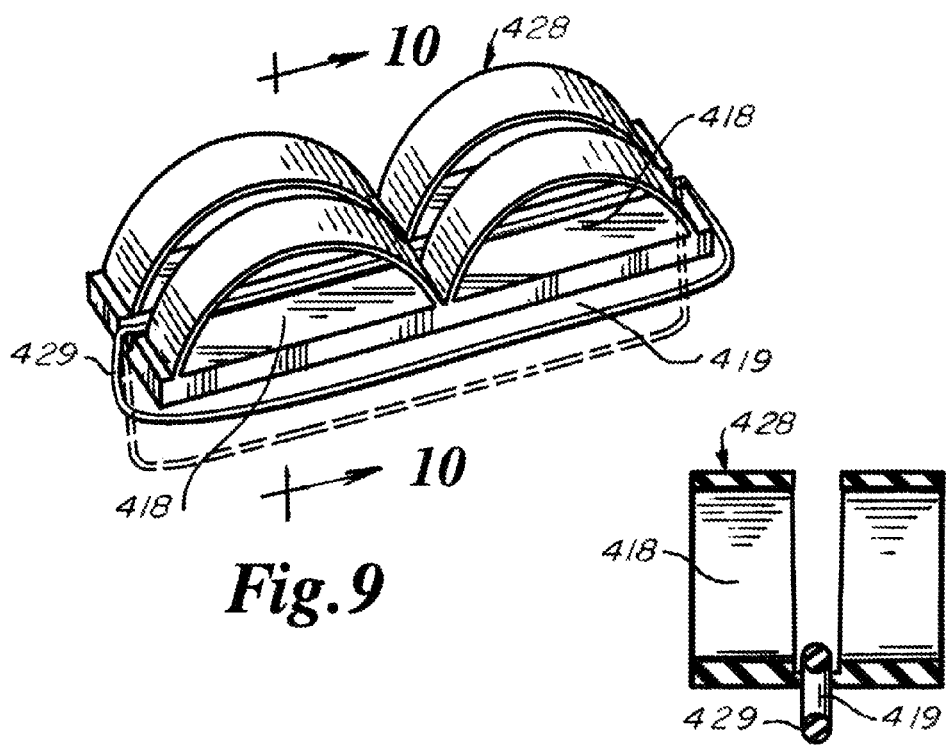
FIG. 9 is a perspective view of a cell phone holding device according to a fourth exemplary embodiment.
Figure 10:
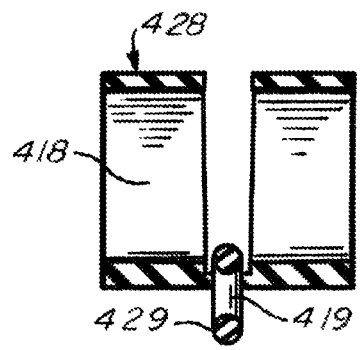
FIG. 10 is a cross-sectional view of the device of FIG. 9.
Figure 13:
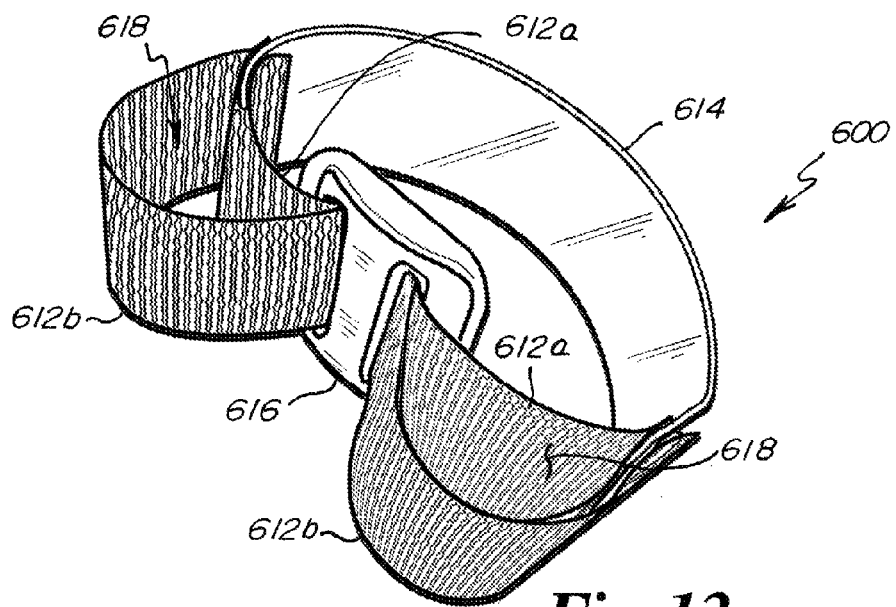
FIG. 13 is a perspective view of a cell phone holding device according to a sixth exemplary embodiment.

FIGS. 9 and 10 show another alternative device 428 made from injection molding and attachable to a cell phone by use of a clear elastic band 429.

Figure 11:
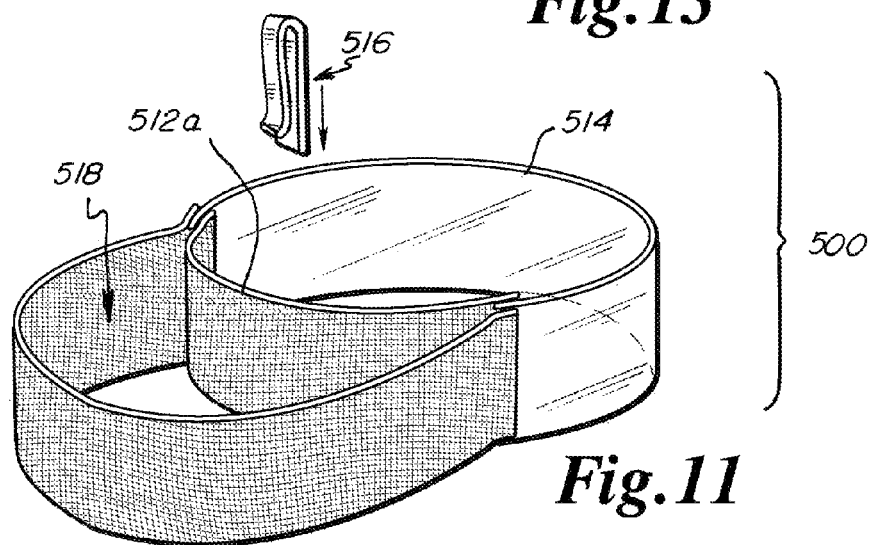
FIG. 11 is an exploded perspective view of a cell phone holding device according to a fifth exemplary embodiment.
Figure 12:
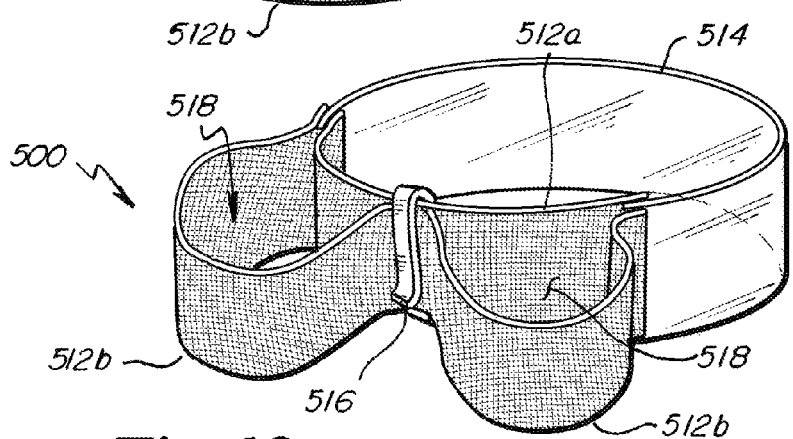
FIG. 12 is an assembled perspective view of the cell phone holding device according of FIG. 11.
Figures 14, 15:
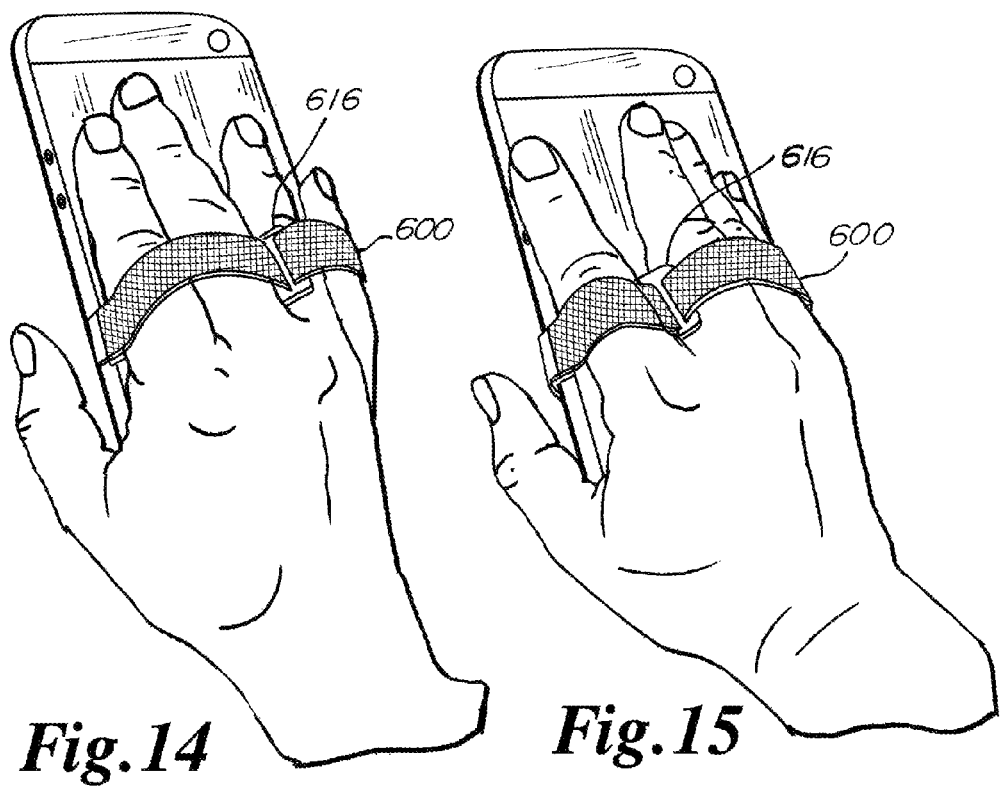
FIGS. 14 through 17 are rear views of the device fitted to a cell phone and used with various finger arrangements.
Figures 16, 17:
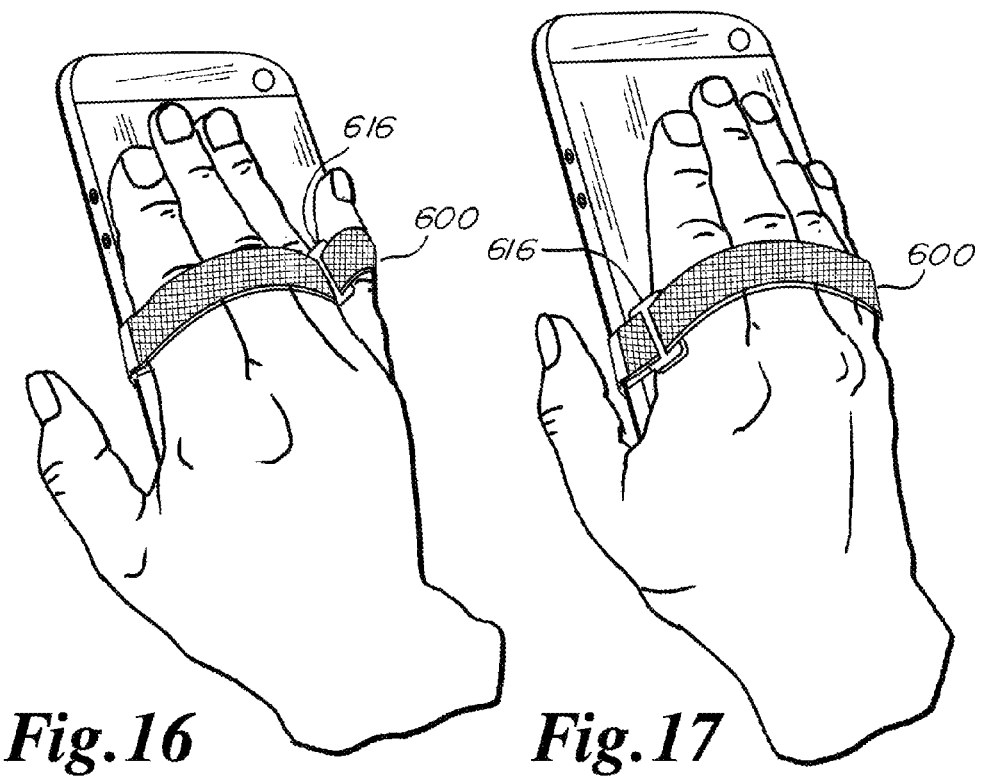

FIGS. 11 and 12 show an embodiment 500 similar to the embodiment of FIGS. 1-5 except that stitch 116b of that first embodiment is replaced here by a removable and movable clip 516 in this embodiment. The optional clip may be not used when the user desires to place all four fingers together, mitten-style, into finger aperture 518. Or the clip may be centrally attached as shown in FIG. 12 to allow the user to put two fingers into each of the created smaller finger apertures. Or the clip may be moved off-center to one side or the other to allow for either a three finger/one finger arrangement, or a one finger/three finger arrangement, according to the comfort of the user.

Finally, an alternative device 600 is shown in FIGS. 13-17 which has a tri-glide fitting slidably attached to and joining the back strap and finger loop strap. The tri-glide is slidable side-to-side relative to both straps, so that the numerous finger arrangements of FIGS. 14-17 are enables, according to the user's comfort.

It should also be appreciated that all of the above embodiments are capable of equally serving either right-handed or left-handed users.

Regardless of the embodiment, all functions of the phone are completely functional while the device is in place. It is flexible and thin, so may fit against the phone to add only minimal thickness to the phone. The phone may then be put in the pocket or into most phone holders without negative effect. At any time, the device may be taken off of the cell phone and put back on only for selective use. There are no attachments, glues, adhesives, or hardware that need to be attached to the phone or the phone case. It is removable to be transferred from one phone to another, or to be used only as desired. Because it is flexible and elastic, one size of the device will fit many cell phones with or without a case, and without adjustments. Only four sizes are required to fit virtually all of the phones in today's market.

It should be understood that while the invention has been shown and described with reference to the specific exemplary embodiment shown, various changes in form and detail may be made without departing from the spirit and scope of the invention, and that the invention should therefore only be limited according to the following claims, including all equivalent interpretation to which they are entitled.

I claim:

1. A band for engaging a handheld electronic device having top, bottom, and side edges, wherein the top and bottom edges are shorter than the side edges, for facilitating the holding and operation thereof, the device being of the type having a front touch screen side and a rear side, the band comprising a continuous loop sufficiently flexible and elastic to be stretched over the top or bottom edge and grasp around the device, and having:
   a transparent portion for overlying the front touch screen; the transparent portion allowing viewing and activation of the front touch screen there-through;
   a rear portion for overlying the rear side,
further comprising a grasping portion affixed to the rear portion and forming a pocket for receiving a plurality of a user's index, middle, and ring holding fingers to allow those fingers to support the device while leaving the user's thumb and/or pinky finger free to operate the touch screen, wherein the holding fingers are pointed from the bottom edge to the top edge when received in the grasping portion; and
a clip; wherein
the clip engages the grasping portion in one of a variety of selectable locations to cause the pocket into two smaller pockets of variable size according to the selected location, each for receiving a variable number of holding fingers.

2. A band for engaging a handheld electronic device having top, bottom, and side edges, wherein the top and bottom edges are shorter than the side edges, for facilitating the holding and operation thereof, the device being of the type having a front touch screen side and a rear side, the band comprising a continuous loop sufficiently flexible and elastic to be stretched over the top or bottom edge and grasp around the device, and having:
   a transparent portion for overlying the front touch screen; the transparent portion allowing viewing and activation of the front touch screen there-through;
   a rear portion for overlying the rear side,
further comprising a grasping portion affixed to the rear portion and forming at least two pockets for receiving one or more of a user's index, middle, and ring holding fingers to allow those fingers to support the device while leaving the user's thumb and/or pinky finger free to operate the touch screen, wherein the holding fingers are pointed from the bottom edge to the top edge when received in the grasping portion; and
   an adjustment fitting, whereby the grasping portion cooperates with the adjustment fitting to selectably vary the size of at least two of the at least two pockets.

* * * * *